Aug. 24, 1943. H. B. BABSON ET AL Re. 22,368

SUPPORT FOR MILKING MACHINES

Original Filed Oct. 8, 1934 2 Sheets-Sheet 1

Inventors:
Henry B. Babson,
Jacob J. Stamper,
By Griffin, Miles, Davies,
Schroeder & Merriam, Attys.

Aug. 24, 1943. H. B. BABSON ET AL Re. 22,368
SUPPORT FOR MILKING MACHINES
Original Filed Oct. 8, 1934 2 Sheets-Sheet 2
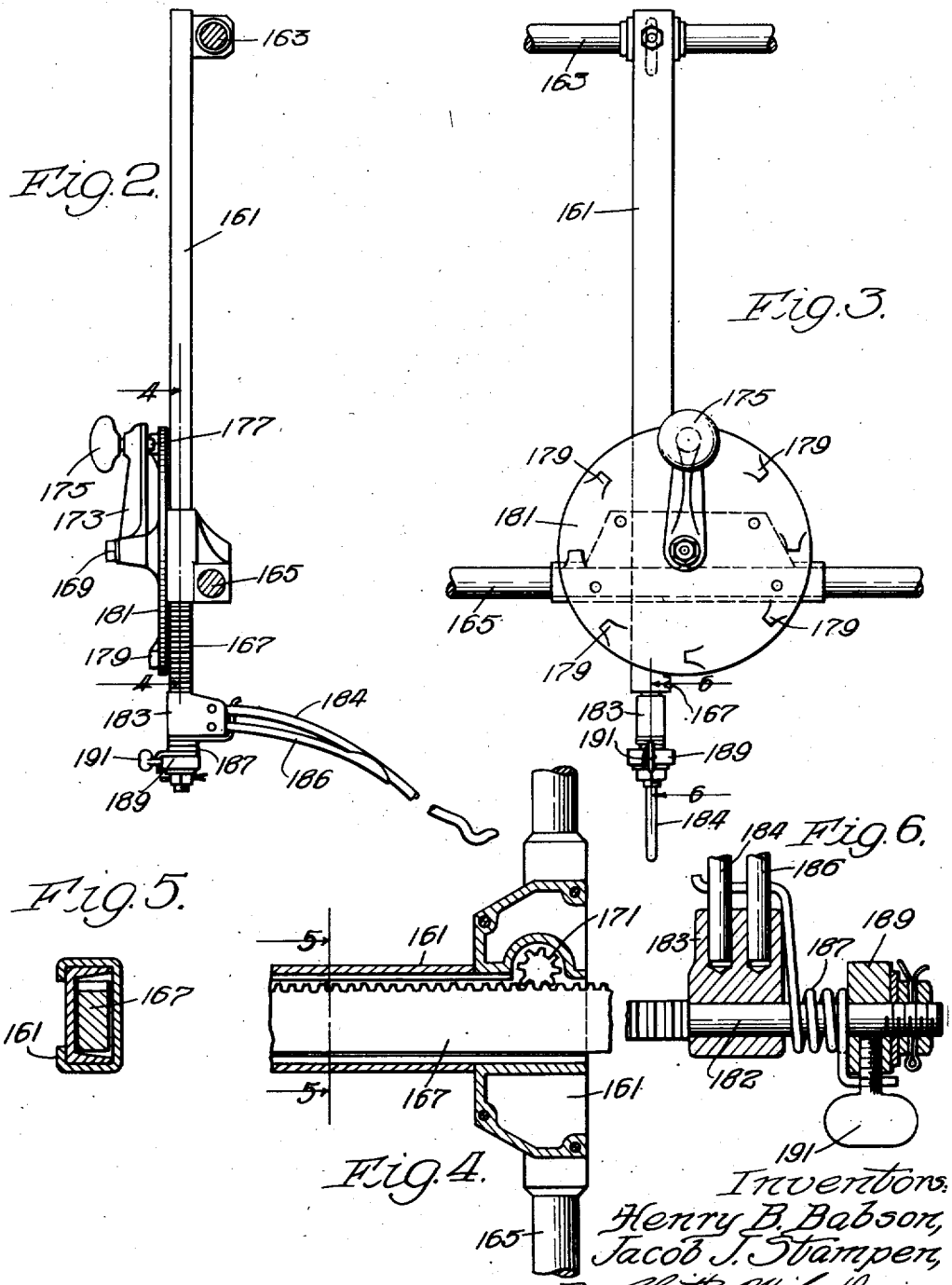
Inventors:
Henry B. Babson,
Jacob J. Stampen,
By Chritton, Wiles, Davis, Schroeder & Merriam, Attys.

Reissued Aug. 24, 1943

Re. 22,368

UNITED STATES PATENT OFFICE 22,368

SUPPORT FOR MILKING MACHINES

Henry B. Babson, Chicago, and Jacob J. Stampen, Hollywood, Ill., assignors to Babson Bros. Co., Chicago, Ill., a corporation of Illinois Original No. 2,136,228, dated November 8, 1938, Serial No. 747,321, October 8, 1934. Application for reissue June 5, 1943, Serial No. 489,804

9 Claims. (Cl. 31—58)

Figure 1:
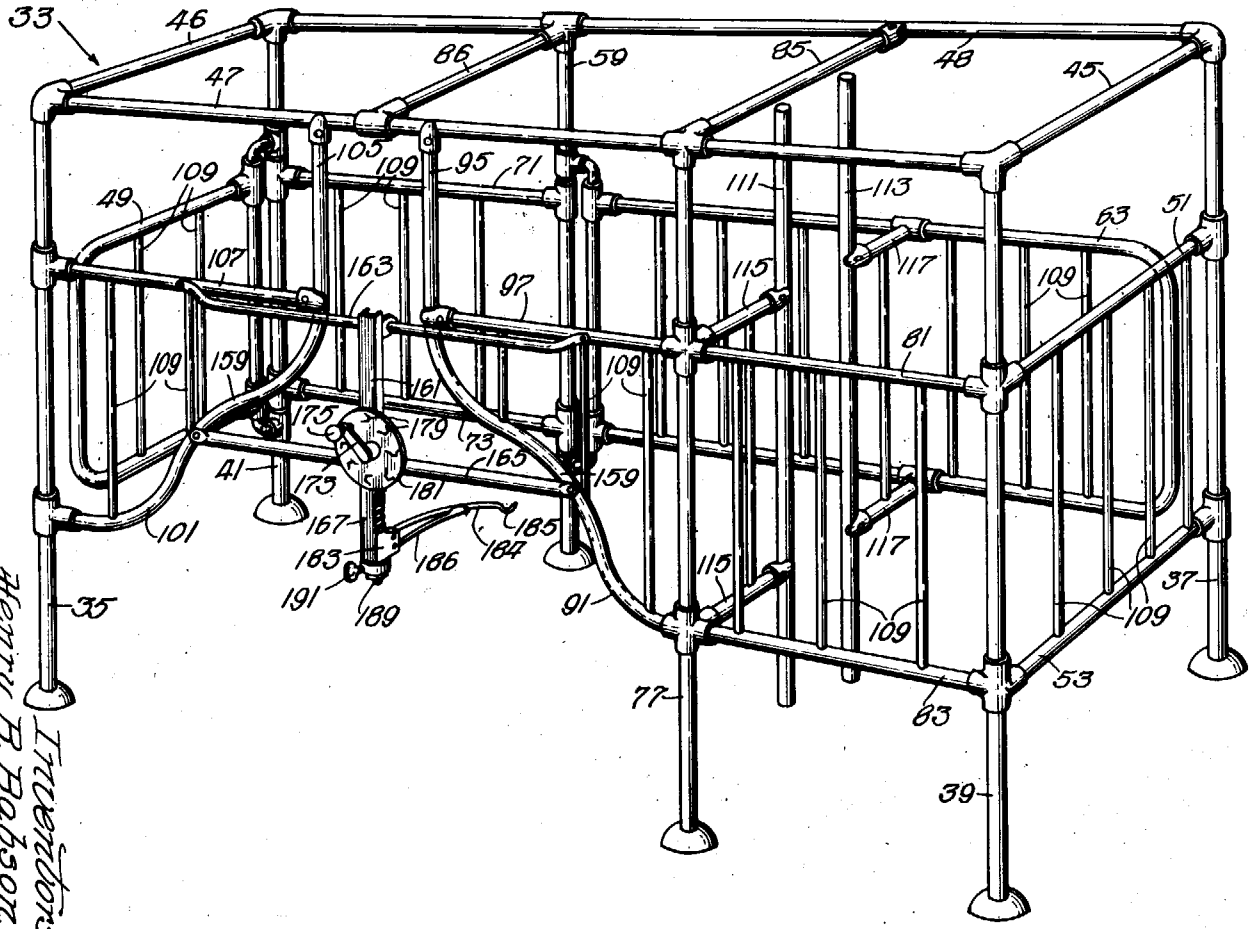

Our invention relates in general to the milking of cows in sanitary fashion and has more particular reference to a support for milking apparatus.

An important object is to provide a milking cage having improved means for supporting a mechanical milking apparatus in adjusted position with respect to an animal in the cage; a further object is to form the cage to facilitate adjustment of the milking apparatus on an animal therein.

Another important object is to provide milking stalls having an adjustable support comprising a support mounted on a side of the stall in position to swing beneath an animal in the cage, adjustable longitudinally of the stall, and adapted to support milking apparatus in adjusted position with respect to an animal in the stall, said support being adapted to swing the milking apparatus out of the stall, after the milking operation is completed, to permit unobstructed exit of the animal from the cage; a further object being to yieldingly bias the support to normally urge the apparatus away from the udder and toward the head of the animal during milking, including means to adjust the force of such bias.

Another object is to provide an adjustable support for milking apparatus, which support is adjustable horizontally and vertically with respect to an animal to be milked; and a further object is to afford a resilient and yielding support for milking apparatus beneath an animal being milked.

Numerous other objects and advantages of the invention will be apparent from the following description, which, taken in connection with the accompanying drawings, discloses a preferred embodiment of the invention.

Referring to the drawings:

Figure 1 is a perspective view illustrating a milking cage provided with a support embodying our present invention;

Figure 2 is a side view and Figure 3 a front view of adjustable support means for milking apparatus which may be used in conjunction with our improved milking cage shown in Figure 1; and Figures 4, 5 and 6, respectively, are sectional views taken substantially along the lines 4—4 in Figure 2, 5—5 in Figure 4, and 6—6 in Figure 3.

To illustrate our invention we have shown on the drawings a milking cage or stall 33 of preferably rectangular arrangement. The stall may be formed of any suitable material and in any desired fashion. However, we prefer to construct the same of metal pipes. To this end, the stall 33 may comprise four corner uprights 35, 37, 39 and 41. The stall preferably comprises spaced apart side walls between which an animal to be milked may be trapped. To this end the stall has an entrance opening preferably arranged at one end of the stall as between the uprights 35 and 41, an entrance gate 49 being provided at said entrance opening. The gate 49 may comprise a pipe bent to provide parallel arms, the ends of which, as shown in the illustrated embodiment, may be hinged to the upright 41, vertical rods 109 being arranged between and connected to the arms of said pipe. The end of the stall opposite the entrance opening is preferably closed by a wall formed in the illustrated embodiment by the horizontal rails 51 and 53 between the uprights 37 and 39, vertical rods 109 being arranged between the rails 51 and 53.

Stanchion means may also be provided in the stall adjacent the end thereof opposite from the entrance opening. In the illustrated embodiment the stanchion comprises a vertical, fixed post 111 supported by connecting pipes 115 from an upright 77 forming a part of the side wall between the uprights 35 and 39. The stanchion also comprises a movable post 113 which is supported by means of the pipes 117 on a shiftable frame 63, which frame preferably comprises a bent pipe forming spaced arms, the ends of which are connected on an upright 59 forming a part of the side wall of the stall between the uprights 37 and 41. Vertical rods 109 may be arranged between the spaced arms of the frame 63. The frame 63 is preferably arranged to swing about the axis of the upright 59 and extends between said upright and the corner post 37, thereby forming a gate normally closing the space between the uprights 37 and 59, which opening affords an outlet through which an animal may exit from the stall. In addition to forming an exit gate, the frame 63 also supports the movable stanchion element 113 so that when closed the neck of an animal in the stall may be received and trapped between the stationary and movable stanchion elements 111 and 113. Rails 71 and 73 are arranged between the uprights 41 and 59 to close the space therebetween and, if desired, vertical rods 109 may be arranged between the rails. Suitable means is preferably provided for holding the gates 49 and 63 in closed position when an animal is in the stall.

The tops of the posts 35, 39 and 77 are interconnected by a rail 47, while the tops of the posts 37, 41 and 59 likewise are interconnected by means of a rail 48. Rails 81 and 83 are arranged between the uprights 39 and 77 to close the intervening space, rods 109 being arranged between said rails, and the space between uprights 35 and 77 is closed by members 91 and 101 which are connected each at one end upon the rail 47 substantially midway between the uprights 35 and 77, the other ends of the members 91 and 101 being connected, respectively, to the uprights 35 and 77. Rails 97 and 107 extend, respectively, between the central portions of the members 91 and 107 and the uprights 77 and 35. Rods 109 may be mounted between the rails 97 and 107 and the lower portions of the members 91 and 101 to close the intervening spaces. The upper ends of the posts 37 and 39 are also connected by the rail 45, while the posts 35 and 41 are likewise interconnected and braced by the rail 46. The post 77 in like fashion is interconnected and braced upon the rail 48 by the cross bar 85.

The milking cage 33 is adapted to permit an animal enclosed in the cage to be milked by any preferred milking method, although the cage is particularly well adapted for use where milking is accomplished by mechanical means. The horizontal portions of the members 91 and 101 are deformed at 159 to provide a space or opening substantially opposite the udder of the animal in the cage so that milking may, if desired, be accomplished by hand. The cage, however, is well adapted to facilitate the use of mechanical milking apparatus, which may be supported from the cage itself. To this end, we provide an adjustable mechanism for carrying the milking apparatus and have shown a preferred form of the adjustable support mechanism, in mounted position, in Figure 1 and, in detail, in Figures 2 through 6.

The support mechanism is carried on a preferably stationary mounting at the milking station, and, as shown in the drawings, the animal stanchioning means or cage 33 may serve as the stationary mounting for the support mechanism. The support mechanism affords means for adjusting the position of the milking apparatus, carried thereby, with respect to the caged animal being milked so that the apparatus may be positioned to accommodate the physical characteristics of each animal as it enters the cage to be milked. Among cows, comprising a herd, there is considerable individual variation in the distance from shoulder to udder and in the elevation of the udder above the floor level. The support device of our present invention permits the mechanism to be quickly and easily adjusted longitudinally of the animal to a position opposite the udder and also permits the rapid adjustment of the apparatus vertically to the correct milking position under the udder. The support further permits yielding movement of the supported apparatus sufficiently to permit the same to follow the limited movement of the animal permitted within the cage. The support further suspends the milking apparatus resiliently under the udder of the animal.

The support mechanism comprises a frame 161, which is mounted at its upper and lower ends for sliding movement on guide rails 163 and 165, which, in turn, are supported on the cage, the upper rail 163 being attached at its opposite ends to the members 97 and 107 and the lower rail 165 being connected at its opposite ends with the members 91 and 101. The frame 161 may thus be adjusted longitudinally of the cage. The frame 161 provides a guide channel for a rack bar 167 movable in the frame in a vertical direction. The frame also provides a journal having a shaft 169 carrying a pinion 171 in position to drivingly engage the rack bar. The shaft 169 is provided with a crank 173 having a handle 175 by which the same may be rotated by an attendant stationed on the floor 23 in order to turn the shaft and pinion 171 and hence raise or lower the rack bar in the frame. The handle 175 is arranged to control a spring pressed detent 177 normally carried in position to engage stops 179, arranged circularly on a dial plate 181 carried on the frame 161, to provide for locking the rack bar at a desired elevation in the frame. When retracted, by means of the handle 175, the detent 177 will clear the stops 179, thus permitting the crank 173 to be turned to adjust the elevation of the rack bar. The lower end of the rack bar is formed as a spindle 182 carrying an arm 184 in position to swing within the cage in position to support a mechanical milker in milking position beneath an animal entrapped in the cage. The arm 184 is preferably of resilient construction comprising, in the illustrated embodiment, a relatively flexible member mounted at one end in a sleeve 183 journalled on the spindle at the lower end of the rack bar 167. The other end of the flexible support member is formed with a hook 185, on which the milking apparatus may readily be suspended. The flexible support member 184 may be braced by an arm 186 which is fastened at one end on the sleeve 183, the other end of said bracing arm 186 underlying the member 184 at a point spaced from the anchored end thereof. Spring means 187 is also preferably provided to yieldingly bias the support means in a desired direction. As may be best seen in Figures 2 and 6, a collar 189 is rotatably mounted on the spindle 182 and adapted to be secured in a desired adjusted position by means of the thumb nut 191; and the spring 187 has its central portion encircling the spindle, one end engaging the collar 189, and the other end lying behind the support arm 184 to yieldingly bias the outer end thereof toward the forward or stanchion end of the stall with a force regulated by the angular position to which the collar is adjusted. Since suspended milkers are supported slightly below and to the front of a cow's udder during milking, the forward bias of the spring and the downward force of the weight of the milker (and its contents, as milking progresses) operate on the resilient arm 184 to provide a yielding downward and forward pull on the udder during milking.

It will be apparent that the hooked end of the flexible milking machine support 184 may be positioned at a desired elevation by adjusting the rack bar 167 by means of the crank 173 and also may be adjusted longitudinally of the cage, to accommodate the size and shape of the animal to be milked, merely by sliding the frame 161 on the rods 163 and 165.

It is thought that the invention and numerous of its attendant advantages and inherent functions will be understood from the foregoing description and it is obvious that numerous changes may be made in the form, construction, and arrangement of the several parts without departing from the spirit or scope of our invention, or sacrificing any of its attendant advantages, the form herein described being a preferred embodiment for the purpose of illustrating our invention.

Having thus described our invention, what we claim as new and desire to secure by Letters Patent is as follows:

1. Adjustable support means for milking apparatus comprising, a support element, resilient suspension means mounted to pivot on the support element about a substantially vertical axis, said suspension means having a portion extending outwardly from the support element and formed to receive and carry the milking apparatus, and yielding means on said support element and operatively associated with said suspension means to urge the same normally in one direction on its pivot whereby to yieldingly bias the suspension member in a direction urging the milking apparatus forwardly of the animal being milked.

2. Adjustable support means for milking apparatus comprising, a support element, resilient suspension means mounted to pivot on the support element about a substantially vertical axis, said suspension means having a portion extending outwardly from the support element and formed to receive and carry the milking apparatus, and yielding means on said support element and operatively associated with said suspension means to urge the same normally in one direction on its pivot whereby to yieldingly bias the suspension member in a direction urging the milking apparatus forwardly of the animal being milked, and means to regulate the turning urge applied by said yielding means on said suspension means.

3. Adjustable support means for milking apparatus comprising, a support element, resilient suspension means mounted to pivot on the support element about a substantially vertical axis, said suspension means comprising a resilient rod pivotally mounted, at one end, on and extending, at the other end, outwardly of said support element, said rod forming a hook to receive and carry the milking apparatus, and yielding means on said support element and operatively associated with said suspension means to urge the same normally in one direction on its pivot whereby to yieldingly bias the suspension member in a direction urging the milking apparatus forwardly of the animal being milked.

4. Adjustable support means for milking apparatus comprising, a support element, means to mount the support element for vertical adjustment at a milking station, resilient suspension means mounted to pivot on the support element about a substantially vertical axis, said suspension means having a portion extending outwardly from the support element and formed to receive and carry the milking apparatus, and yielding means on said support element and operatively associated with said suspension means to urge the same normally in one direction on its pivot whereby to yieldingly bias the suspension member in a direction urging the milking apparatus forwardly of the animal being milked.

5. Adjustable support means for milking apparatus comprising, a support element, means to mount the support element for horizontal movement at a milking station, resilient suspension means mounted to pivot on the support element about a substantially vertical axis, said suspension means having a portion extending outwardly from the support element and formed to receive and carry the milking apparatus, and yielding means on said support element and operatively associated with said suspension means to urge the same normally in one direction on its pivot whereby to yieldingly bias the suspension member in a direction urging the milking apparatus forwardly of the animal being milked.

6. Adjustable support means for milking apparatus comprising, a support element, means to mount the support element for horizontal movement and also for vertical adjustment at a milking station, resilient suspension means mounted to pivot on the support element about a substantially vertical axis, said suspension means having a portion extending outwardly from the support element and formed to receive and carry the milking apparatus, and yielding means on said support element and operatively associated with said suspension means to urge the same normally in one direction on its pivot whereby to yieldingly bias the suspension member in a direction urging the milking apparatus forwardly of the animal being milked.

7. Adjustable support means for milking apparatus comprising, a support element, horizontally movable mounting means for carrying the support element at a milking station, means to vertically adjust the support element on the mounting means, resilient suspension means mounted to pivot on the support element about a substantially vertical axis, said suspension means having a portion extending outwardly from the support element and formed to receive and carry the milking apparatus, and yielding means on said support element and operatively associated with said suspension means to urge the same normally in one direction on its pivot whereby to yieldingly bias the suspension member in a direction urging the milking apparatus forwardly of the animal being milked.

8. Adjustable support means for milking apparatus comprising, a support element, resilient suspension means mounted to pivot on the support element about a substantially vertical axis, said suspension means having a portion extending outwardly from the support element and formed to receive and carry the milking apparatus, yielding means on said support element and operatively associated with said suspension means to urge the same normally in one direction on its pivot whereby to yieldingly bias the suspension member in a direction urging the milking apparatus forwardly of the animal being milked, and means for regulating the force urging the milking apparatus forwardly.

9. Adjustable support means for milking apparatus comprising, a support element, means to mount the support element for horizontal movement and also for vertical adjustment at a milking station, resilient suspension means mounted to pivot on the support element about a substantially vertical axis, said suspension means having a portion extending outwardly from the support element and formed to receive and carry the milking apparatus, yielding means on said support element and operatively associated with said suspension means to urge the same normally in one direction on its pivot whereby to yieldingly bias the suspension member in a direction urging the milking apparatus forwardly of the animal being milked, and means for regulating the force urging the milking apparatus forwardly.

HENRY B. BABSON.
JACOB J. STAMPEN.